United States Patent Office 3,508,357
Patented Apr. 28, 1970

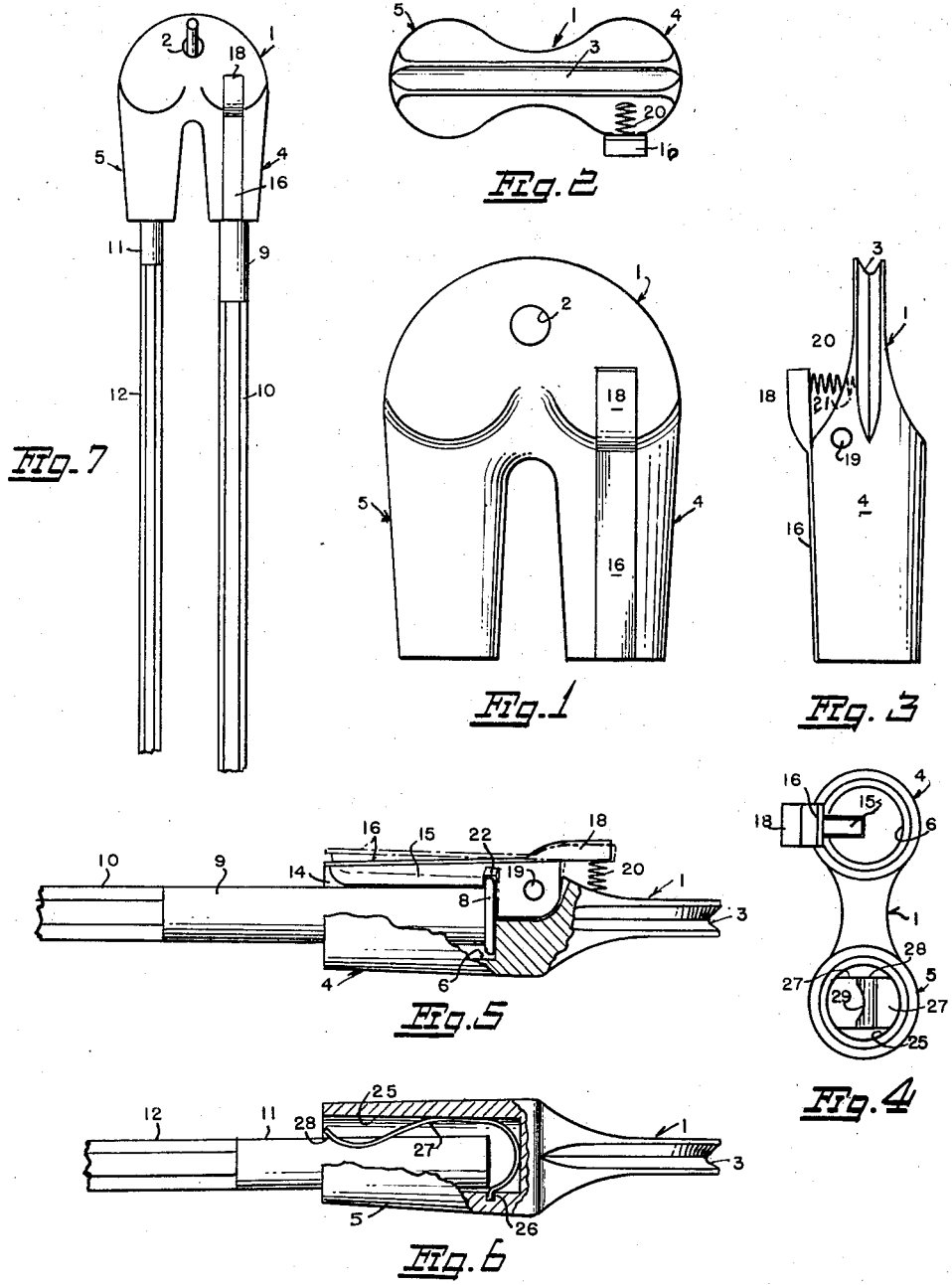

3,508,357
COMBINATION FISHING ROD CARRIER, HOLDER, AND DISPLAY HANGER
Arthur C. Collin and Viola R. Collin, both of 372 W. Oak St., Lebanon, Oreg. 97355
Filed Feb. 15, 1968, Ser. No. 705,807
Int. Cl. A01k 97/10
U.S. Cl. 43—26                               1 Claim

ABSTRACT OF THE DISCLOSURE

A fishing rod holder comprising a head member having uniform, hollow, parallel leg members extending therefrom for automatically gripping and holding fishing rod sections in parallel relationship to each other for transporting or display purposes. One leg member is provided with internally-positioned spring-biased means to grip one rod section therein and the other leg member has a spring latch pivotably mounted thereon and movable through a slot to engage and hold a second rod section within the said other leg member.

---

This invention relates to improvements in devices of the type shown and described in our U.S. Patent No. 3,319,910.

As therein pointed out, the primary object of the invention is to provide a device for interconnecting disjointed sections of a fishing rod for carrying or for suspending the sections for display purposes.

The principal objects of the present invention are:

To provide a device of the character described having two hollow leg portions of equal length and outside diameters capable of holding sections of a fishing rod by mere insertion of their ferruled ends to the interior of the leg members.

To provide a holder of this character which is of cast metal and therefore capable of inexpensive quantity production.

To provide a device whose ferrule-gripping components are functionally automatic in gripping any size ferrule within a given range.

To provide a holder whose gripping action is such that it prevents accidental or unintentional release or disengagement of the ferrules from their respective leg portions of the holder.

The foregoing and other objects and advantages which will become subsequently apparent reside in the details of construction and operation as more fully hereinafter described and claimed, reference being had to the accompanying drawing forming a part hereof and in which:

FIGURE 1 is an elevational view of a fishing rod holder made in accordance with this invention.

FIGURE 2 is a top plan view of FIGURE 1.

FIGURE 3 is a side elevational view of FIGURE 1.

FIGURE 4 is a bottom elevation view of FIGURE 3.

FIGURE 5 is an elevational view of the hollow leg on the right side of FIGURE 1 with a fragment broken away to reveal internal parts and the ferrule of one section of a fishing rod removably secured on the interior of the leg.

FIGURE 6 is a similar view of the opposite leg of FIGURE 1 with another section of the fishing rod in gripped engagement therewithin.

FIGURE 6A is an end elevational view of FIGURE 6, and

FIGURE 7 is an assembly view on a reduced scale illustrating exemplary fishing rod sections suspended by the holder removably attached to a wall or the like.

With continuing reference to the drawing wherein like reference numerals designate like parts, the main body of the device, as best illustrated in FIGURES 1–3 and made entirely of cast metal, includes a head 1 having an opening 2 therein and grooved over the top as at 3. The head 1 is cast integral with two hollow, uniformly tapering legs 4 and 5 whose inside diameters are preferably, though not restrictively, equal.

As best illustrated in FIGURE 5, the inside diameter 6 of the leg 4 is slightly greater than that of the beading 8 at the rim of the conventional hollow ferrule 9 at one end of one fishing rod section 10.

The leg 4 is slotted as at 14 substantially throughout its length to accommodate a rib 15 (FIGS. 4–5) of a latch 16 terminating at one end in a finger grip 18 and pivotally attached to the leg by a pivot pin 19. The latch 16 is normally maintained in the closed position shown in full lines by a compression spring 20 whose one end is attached to the finger grip and the other end to the top of the leg at 21 as best shown in FIGURE 3. The rib 15 is notched as at 22 in advance of the pivot pin 19 and thereby adapted to automatically engage and hold the beading 8 of the ferrule 9 when the same is inserted into the leg 4 into abutment with the inner end wall of the leg.

Thus it will be seen that elevating the latch 16 by downward pressure on the finger grip 18 will release the beading 8 and hence the ferrule 9 and its rod section for easy removal from the leg.

The bore 25 of the other leg 5 (FIG. 6) is provided with a notch 26 in one wall near the inner end thereof for cooperation with the opposite wall for retaining a leaf spring 27 within the bore with the free end 28 of the spring having an elongated opening 29 therein for straddling and gripping the ferrule 11 of another rod section 12, as best shown in FIGURE 6A.

From the foregoing it will be readily understood that a fishing line threaded through the guides (not shown) of fishing rod sections held or supported by the device as illustrated in FIGURE 7, or hand carried can be advantageously entrained over the head 1 of the device within the groove 3 and so held by tension by a fishing reel (not shown) carried by one of the sections in the usual manner.

The rod sections 10 and 12 can be quickly and conveniently inserted into their respective leg portions 4 and 5, automatically gripped by the latch 16 in FIGURE 5 and section 12 by the leaf spring 27 in FIGURE 6 and both so held for transportation or display purposes. The sections can be conveniently removed by downward pressure on the finger grip 18 (FIG. 5) and by an outward pull on section 12 to disengage its ferrule 11 from the gripping action of the spring 27 (FIG. 6).

What we claim is:

1. A holder for sections of a fishing rod, comprising a head integral with two hollow leg members of equal length and equal outside diameter.

one of said leg members having a notch in its inner wall, spring-biased means on the interior of said one of said hollow leg members engaged with said notch and adapted to bear against one side of an inserted ferruled end of one fishing rod section, the other of said hollow leg members having a slot extending throughout the length thereof and terminating within said head, a latch disposed within the length of said slot coterminous therewith, pivot means extending through said slot and said latch at their said coterminous ends whereby the latch is radially movable outwardly and inwardly relative to said slot and to the interior of said hollow leg member, said latch having a finger grip extending beyond said pivot means, a compression spring interposed between said head and said finger grip to thereby normally hold said latch inwardly relative to said slot, and said latch having an inwardly-opening notch adapted for spring-urged engagement with beading on the ferruled end of another section of a fishing rod.

References Cited

UNITED STATES PATENTS

| | | | |
|---|---|---|---|
| 986,761 | 3/1911 | Roscoe | 287—119 X |
| 998,319 | 7/1911 | Young | 287—119 |
| 1,909,353 | 5/1933 | Hughes et al. | 287—119 |
| 2,595,746 | 5/1952 | Zinn | 43—26 |
| 2,690,925 | 10/1954 | Reis | 287—119 X |
| 3,319,910 | 5/1967 | Collin et al. | 43—26 |

ALDRICH F. MEDBERY, Primary Examiner

D. J. LEACH, Assistant Examiner

U.S. Cl. X.R.

224—45; 248—40; 287—119